Patented Sept. 7, 1926.

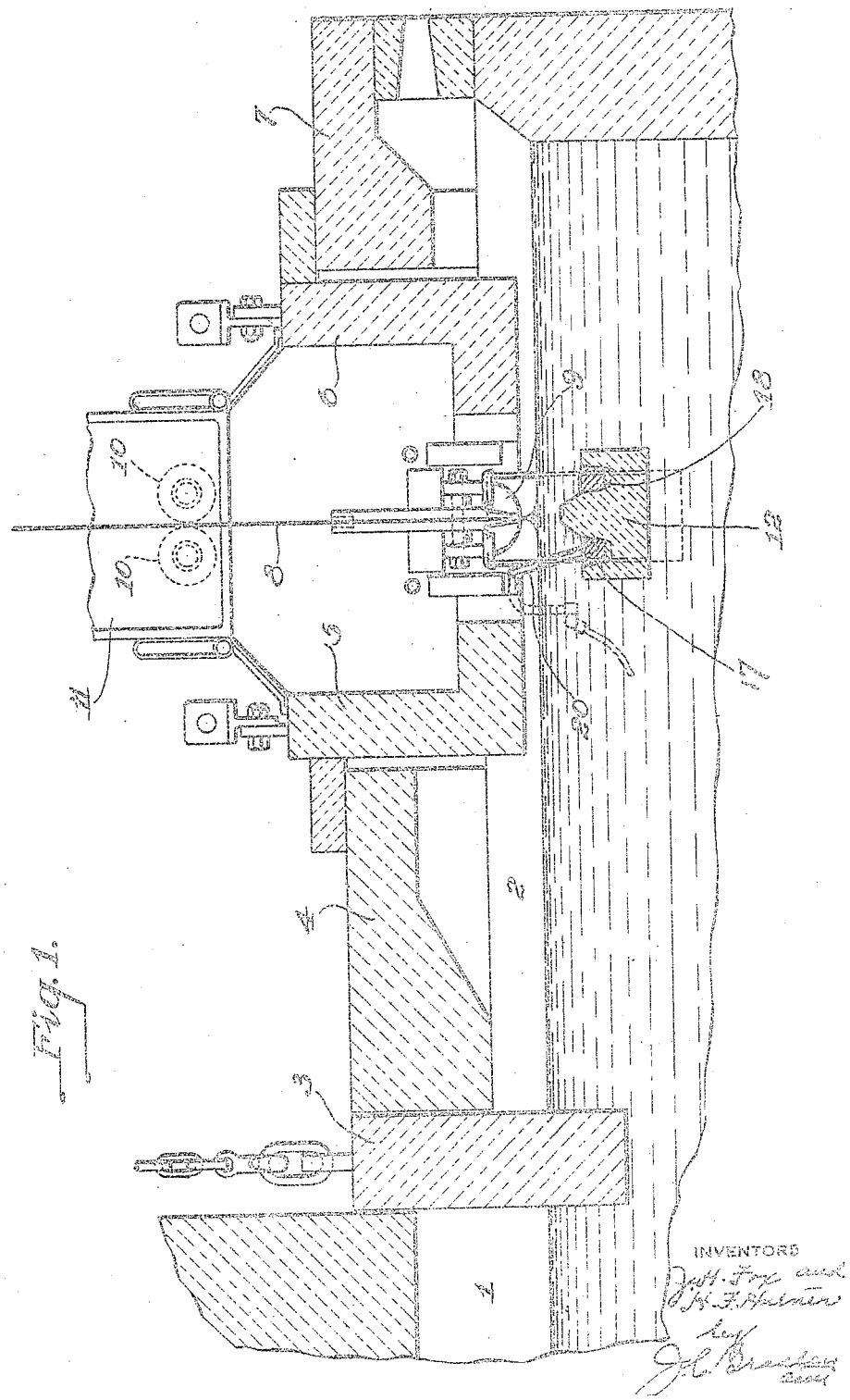

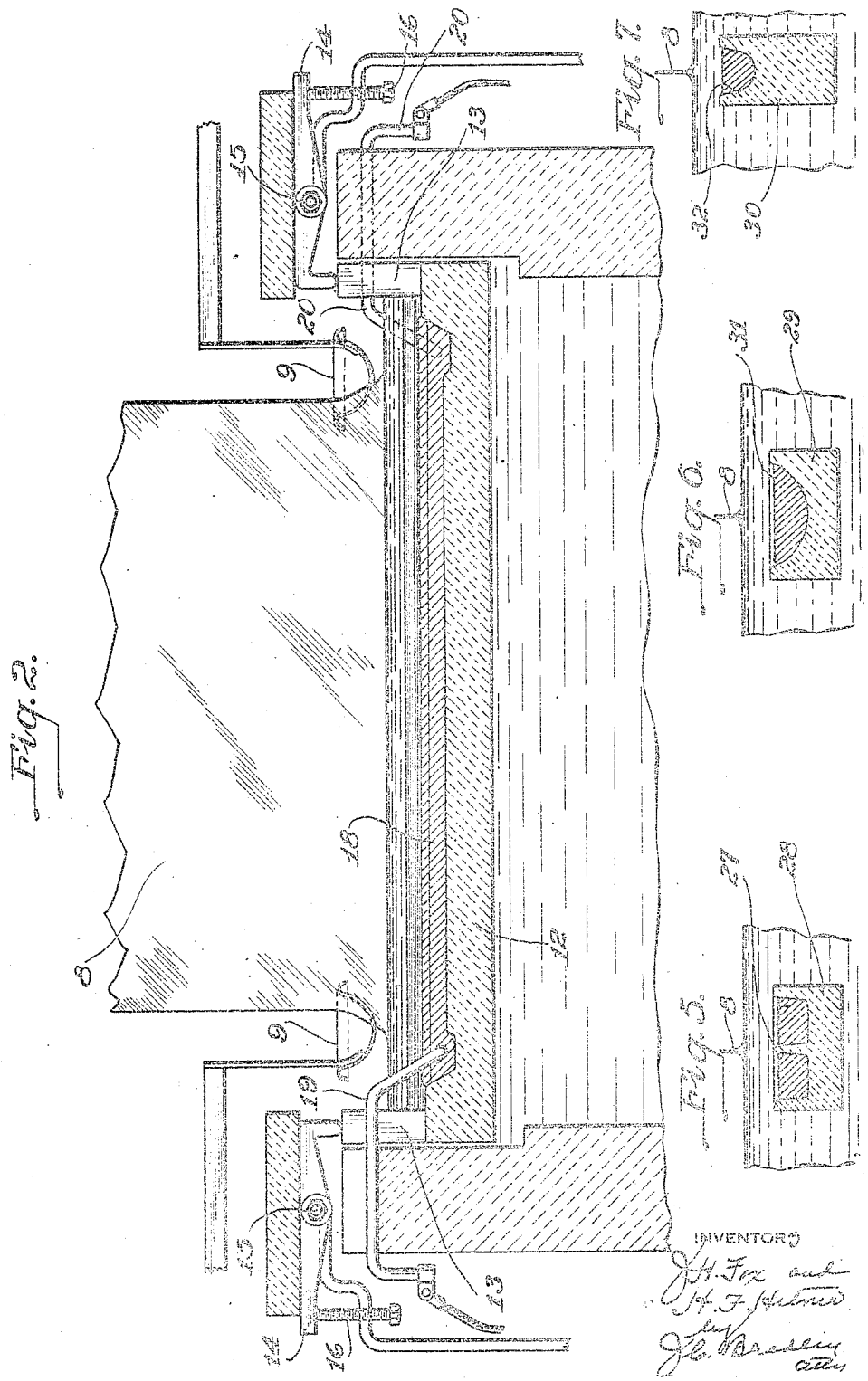

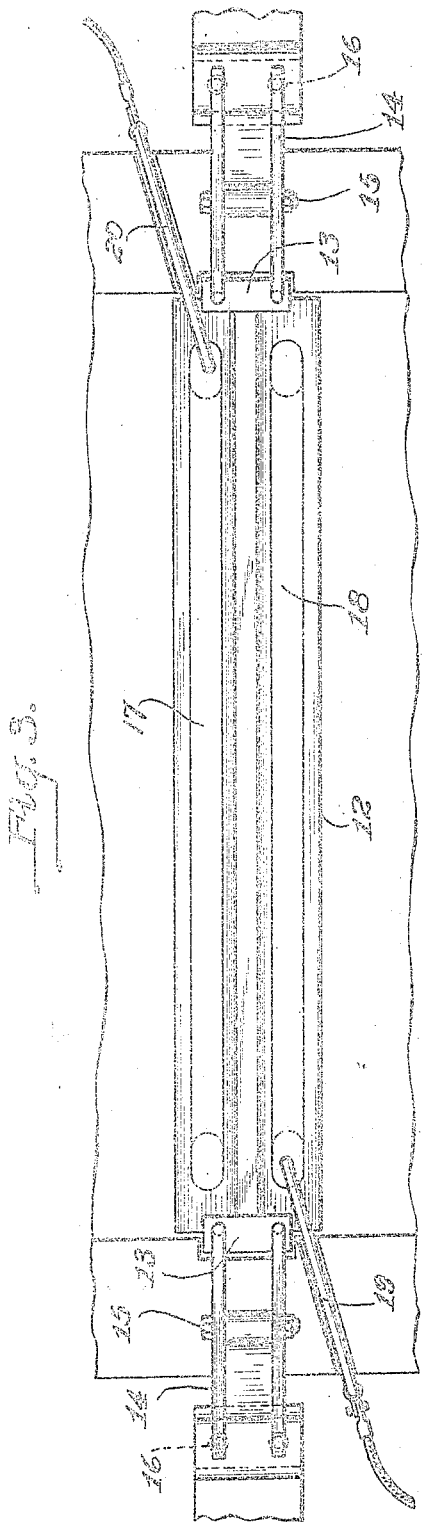
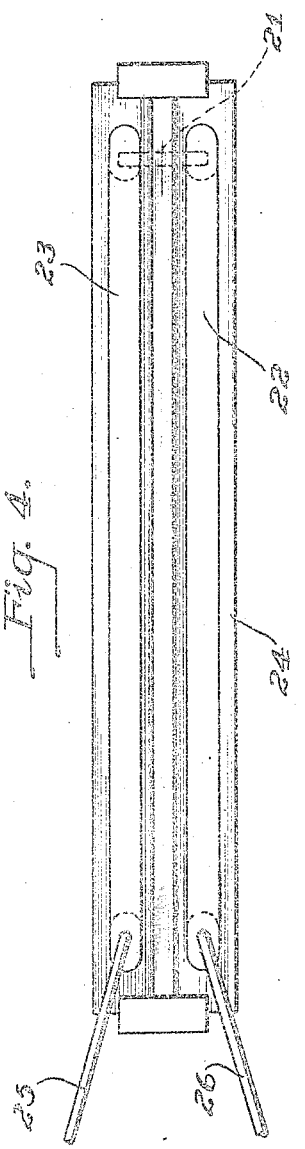

1,598,764

UNITED STATES PATENT OFFICE.

JOHN H. FOX AND HARRY F. HITNER, OF PITTSBURGH, PENNSYLVANIA, ASSIGNORS TO PITTSBURGH PLATE GLASS COMPANY, A CORPORATION OF PENNSYLVANIA.

APPARATUS FOR MAKING SHEET GLASS.

Application filed January 13, 1926. Serial No. 80,938.

The invention relates to an apparatus for making sheet glass from a tank, and particularly to the type employing a draw-bar submerged in the bath below the line of generation of the sheet. In the use of such a draw-bar over a considerable period of time, there is a gradual accumulation of devitrified glass along the upper surface of the bar, which devitrified glass then becomes detached in small particles from time to time and is drawn into the sheet above, thus materially impairing its quality. To get rid of this devitrified glass, it is the custom, at intervals, varying in length depending upon conditions, to discontinue the drawing operation, cover over the drawing opening and bring the glass beneath to a relatively high temperature for an hour or more. This remelting operation involves a considerable waste of time, and it is the objects of the present invention, (1) to provide means for preventing, in a very large degree, the formation of devitrified glass upon the draw-bar, and (2) to provide means for superheating the glass above the draw-bar in a minimum period of time to remove any devitrified glass which does form, and without the necessity of covering over the drawing opening or of removing the water cooling devices ordinarily used above the surface of the glass on either side of the sheet. Certain embodiments of the invention are illustrated in the accompanying drawings, wherein:

Figure 1 is a vertical section through the apparatus, the drawing mechanism being indicated in a diagrammatic way only. Fig. 2 is a vertical section at right angles to that of Fig. 1. Fig. 3 is a plan view. Fig. 4 is a partial plan view of a modification. And Figs. 5, 6 and 7 are sectional views through other forms of a draw-bar.

Referring to the drawings, 1 is the outlet end of a melting tank, preferably of the regenerator type and 2 is a drawing kiln or tank having communication with the melting tank, so that hot glass is supplied to the kiln to take the place of the glass which is withdrawn in the formation of the continuous sheet or ribbon. A cut-off or gate 3 is provided between the melting tank and drawing kiln and the surface of the glass in the kiln is closed in over the major portion of its area by means of the refractory blocks 4, 5, 6 and 7. The edges of the glass sheet 8 which is drawn are kept from moving inward by means of edge holding members 9, 9 similar to those shown in the Slingluff Patent No. 1,549,513 of August 11, 1925. The drawing of the sheet upward continuously from the bath may be accomplished by any desired means but this is preferably done by means of a series of pairs of rollers 10, 10 mounted in an annealing casing 11, which casing, as shown, terminates a short distance above the surface of the bath.

A clay draw-bar 12, preferably of the cross section shown in Fig. 1 is employed, such draw-bar serving to maintain the line of draw of the sheet constant and to reduce the temperature of the layer of glass lying beneath the line of generation of the sheet. The bar is maintained with its upper surface submerged below the level of the glass by means of the refractory blocks 13, 13 which may be adjusted up and down by means of the levers 14 pivoted at 15 and adapted to be moved to various positions of adjustment by means of the screws 16. The draw bar is provided upon its upper surface with a pair of longitudinal grooves, which grooves are filled with the bodies of molten metal 17 and 18, such metal preferably being antimony, although any other suitable metal which does not react with the glass may be employed. These bodies of molten metal constitute electrodes and are supplied with current from a suitable source through the terminals 19 and 20, the terminal 19 having its end immersed in the metal 18 adjacent the end of the groove, while the terminal 20 has its end immersed in the metal 17 adjacent the other end of the groove containing such metal.

After the drawing of the sheet 8 has been continued for a considerable period of time and devitrified glass has begun to form over the upper edge of the draw-bar, a powerful flow of current is passed between the terminals 19 and 20, and this flow of current passes through the layer of glass lying over the central portion of the bar from one groove to the other. Reheating of this layer of glass may thus be secured, the extent to which it is carried being readily regulated by the character of the flow of current. After the reheating operation has proceeded to such an extent as to properly recondition the glass, the drawing operation may be resumed. In fact, this drawing operation may be continued while the reheating operation is under way, although the glass produced under these conditions would be of little value and would be continued merely to avoid the trouble incident to starting a new draw with a bait in the usual way. By the method as above set forth, the glass above the draw-bar may be brought to the desired temperature and reconditioned in a relatively short space of time, so that the time lost in this melting operation is greatly reduced as compared with the time required in the old operation heretofore referred to, which required the removal of the edge holding devices and of the cooling apparatus, and the covering over of the space between the blocks 5 and 6 in order to secure a sufficient degree of heat in the bath therebeneath. It is desirable that the terminals 19 and 20 should be located at opposite ends of the grooves carrying the metal 17 and 18 as this eliminates any tendency of the current to flow directly across from one terminal to the other, such as would be the case if both terminals were located at adjacent ends of the grooves.

Fig. 4 illustrates a modification in which a communication 21 is provided between the ends of the bodies of metal 22 and 23 in the grooves of the draw-bar 24, the terminals 25 and 26 being placed, in this instance, at the same ends of the grooves. With this arrangement, there is no flow of current through the glass itself, the current flowing directly between the bodies of metal 22 and 23 through the connecting body 21, so that the glass lying above the draw-bar is heated by conduction rather than by the resistance afforded by the glass to the passage of the current therethrough as is the case in the use of the apparatus of Figs. 1 to 3. The operation as set forth in connection with Figs. 1 to 3 is preferred as being more rapid and positive, but it is quite possible to secure the necessary reheating effect by the use of the arrangement shown in Fig. 4.

We have also found in using the draw-bar with the pockets of molten antimony that the tendency of devitrified glass to accumulate upon the draw-bar is very materially reduced, and in some cases, almost entirely eliminated, so that, even when not employed with electric current for reconditioning the glass, the use of the molten metal in the draw-bar constitutes a very important improvement. It is believed that this improved result is due to the fact that the use of the molten metal reduces the tendency of the glass passing over the bar and into the sheet to cling to the bar. The molten metal does not hold or retard the movement of the glass over its surface as clay does, and devitrification only occurs when glass is held at a devitrifying temperature through a considerable period of time. This period of lag or detention is materially reduced by reducing the area of clay in contact with the glass on the upper side of the bar. Figs. 5, 6 and 7 show sections of other draw-bars designed to decrease the area of clay exposure upon the upper face of the bar, so as to reduce the tendency of the bar to retard the flow of glass thereover. In the Fig. 5 construction, the central ridge 27 of the bar 38 is thinner and of less height than is the case in the Fig. 1 construction, so that the tendency to hold the glass is materially reduced. In the construction of Figs. 6 and 7 the central ridge of clay is entirely eliminated, the bars 29 and 30 being provided with the central grooves 31 and 32 filled with molten metal. Various other modifications are possible, the invention comprehending broadly the use upon the draw-bar of a body of molten antimony or other metal suitable for the purpose.

What we claim is:

1. The combination with a glass drawing tank, of a draw-bar of refractory material extending transversely of the tank submerged below the surface of the glass and provided on its upper side with a longitudinal groove, a molten metal lying in said groove, and means for causing a flow of electric current through said molten metal to heat the glass lying above the draw-bar.

2. The combination with a glass drawing tank, of a draw-bar of refractory material extending transversely of the tank submerged below the surface of the glass and provided on its upper side with a pair of grooves extending longitudinally of the bar, molten metal in said grooves, and means for causing a flow of electricity from one groove to the other to heat the glass lying therebetween in the path of such current.

3. The combination with a glass drawing tank, of a draw-bar of refractory material extending transversely of the tank submerged below the surface of the glass and provided on its upper side with a pair of grooves extending longitudinally of the bar, molten metal in said grooves, a pair of terminals one of which contacts with the metal at the end of one groove, and the other of which contacts with the metal of the other groove at the end thereof remote from the first terminal, and means for causing a flow of electric current between the two terminals.

4. The combination with a glass drawing tank, of a draw-bar of refractory material extending transversely of the tank below the surface of the glass and provided upon its upper side with a longitudinal groove, and a molten metal lying in said groove.

5. The combination with a glass drawing tank, of a draw-bar of refractory material extending transversely of the tank below the surface of the glass and provided upon its upper side with a longitudinal groove, and a body of molten antimony lying in said groove.

6. The combination with a glass drawing tank, of a draw-bar of refractory material extending transversely of the tank below the surface of the glass and provided upon its upper side with a pair of longitudinal grooves with a ridge of the refractory material lying therebetween, and molten metal lying in said grooves, said ridge of refractory material projecting above the level of the metal in said grooves.

In testimony whereof, we have hereunto subscribed our names this 8th day of January, 1926.

JOHN H. FOX.
HARRY F. HITNER.